US011169242B2

(12) United States Patent
Tzirkel-Hancock et al.

(10) Patent No.: US 11,169,242 B2
(45) Date of Patent: Nov. 9, 2021

(54) METHOD AND SYSTEM FOR LOCATING MOBILE DEVICE RELATIVE TO VEHICLE

(71) Applicant: GM GLOBAL TECHNOLOGY OPERATIONS LLC, Detroit, MI (US)

(72) Inventors: Eli Tzirkel-Hancock, Ra'anana (IL); Noam Shabtai, Herzliya (IL); Nadav Lavi, Ramat-Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 558 days.

(21) Appl. No.: 16/149,600

(22) Filed: Oct. 2, 2018

(65) Prior Publication Data

US 2020/0103487 A1    Apr. 2, 2020

(51) Int. Cl.
*G01S 5/00* (2006.01)
*H04W 4/02* (2018.01)
*H04W 12/06* (2021.01)
*H04W 4/40* (2018.01)

(52) U.S. Cl.
CPC .......... *G01S 5/0027* (2013.01); *G01S 5/0054* (2013.01); *H04W 4/023* (2013.01); *H04W 12/06* (2013.01); *H04W 4/40* (2018.02)

(58) Field of Classification Search
CPC ........ G01S 5/0027; G01S 5/0054; G01S 5/24; G01S 1/753; G01S 3/808; G01S 5/26; H04W 4/023; H04W 12/06; H04W 4/40; G07C 2009/00801; G07C 2209/63; G07C 9/00174
See application file for complete search history.

(56) References Cited

U.S. PATENT DOCUMENTS

| 9,689,958 | B1* | 6/2017 | Wild ....................... G01S 3/801 |
| 2001/0005170 | A1* | 6/2001 | Heide .................. G06K 7/0008 |
| | | | 340/5.61 |
| 2007/0147482 | A1* | 6/2007 | Shirai ..................... G01S 3/808 |
| | | | 375/148 |
| 2017/0361806 | A1 | 12/2017 | Scheim et al. |
| 2018/0252796 | A1* | 9/2018 | Qu .......................... H04R 1/40 |
| 2019/0082313 | A1* | 3/2019 | Kerselaers ............ B60W 30/09 |

OTHER PUBLICATIONS

Office Action Issued by the German Patent Office for application 10 2019 115 638.6 dated May 11, 2020, 6 pages.

* cited by examiner

*Primary Examiner* — James J Yang
(74) *Attorney, Agent, or Firm* — Cantor Colburn LLP (57) ABSTRACT

A system and method for locating a mobile device relative to a vehicle using mechanical waves and modulation techniques. A high frequency carrier wave that is generally inaudible to humans is modulated with a low frequency baseband signal that provides for accurate localization in order to generate a modulated signal. The modulated signal is a mechanical or pressure wave, as opposed to an electromagnetic (EM) wave, that is transmitted by one or more speaker(s) and is received by one or more microphone(s). In one example, the modulated signal is transmitted from a speaker on the mobile device (e.g., a smart phone) to a number of microphones mounted on the vehicle at specific distances apart, so as to establish multiple localization paths whose differences in phase can be used to determine the location of the mobile device, relative to the vehicle.

20 Claims, 6 Drawing Sheets

*FIG. 5*

METHOD AND SYSTEM FOR LOCATING MOBILE DEVICE RELATIVE TO VEHICLE

TECHNICAL FIELD

The present invention relates generally to locating a mobile device relative to a vehicle, such as when a user carrying the mobile device is approaching the vehicle in a parking lot or parking structure with a number of other vehicles.

BACKGROUND

For many existing vehicles, a user can use a mobile device, such as a smartphone or key fob, to control certain vehicle functions. For instance, it is well known for a user to engage an app on a smartphone or a key fob to unlock a vehicle door or to remote start the vehicle.

For some applications, such as those where the vehicle uses the direction of arrival (DOA) of the approaching user to activate some vehicle function, it may be necessary to determine the location of the mobile device relative to the vehicle. This is sometimes referred to as "localization." To accurately determine the location of the approaching mobile device, low frequency waves can be used. However, low frequency waves are usually audible to humans and, therefore, disruptive. High frequency waves, on the other hand, are typically inaudible to humans, but can produce a certain amount of ambiguity in terms of the location of the mobile device, particularly if the speakers/microphones involved are not spaced close enough together.

The method and system disclosed herein address these issues.

SUMMARY

According to one aspect, there is provided a method of locating a mobile device relative to a vehicle, the method comprising the steps: generating a modulated signal from a carrier wave and a baseband signal where the modulated signal is a mechanical wave, the carrier wave has an average carrier frequency and the baseband signal has an average baseband frequency that is less than the average carrier frequency; causing the modulated signal to be transmitted from one or more speakers located on the mobile device or the vehicle; causing the modulated signal transmitted from the speaker(s) to be received at one or more microphones located on the other of the mobile device or the vehicle over a plurality of localization paths; demodulating the modulated signal received at the microphone(s) for each of the plurality of localization paths to obtain a plurality of demodulated signals; and processing the plurality of demodulated signals to determine a location of the mobile device relative to the vehicle.

According to another aspect, there is provided a vehicle-mobile device localization system, comprising: one or more mechanical wave input/output (I/O) devices installed on a vehicle; an electronic control unit (ECU) installed on the vehicle and communicatively coupled to the one or more mechanical wave I/O device(s), the ECU includes a processor and memory that stores computer instructions; wherein the computer instructions, when executed by the processor of the ECU in conjunction with computer instructions stored on a mobile device, cause the vehicle-mobile device localization system to either: transmit a modulated signal using the one or more mechanical wave I/O device(s) installed on the vehicle over a plurality of localization paths, where the transmitted modulated signal is generated from a carrier wave and a baseband signal and is a mechanical wave, the carrier wave has an average carrier frequency and the baseband signal has an average baseband frequency that is less than the average carrier frequency; or receive a modulated signal at the one or more mechanical wave I/O device(s) installed on the vehicle over a plurality of localization paths, where the received modulated signal was generated from a carrier wave and a baseband signal and is a mechanical wave, the carrier wave has an average carrier frequency and the baseband signal has an average baseband frequency that is less than the average carrier frequency, and wherein the vehicle-mobile device localization system demodulates the modulated signal for each of the plurality of localization path to obtain a plurality of demodulated signals, and then processes the plurality of demodulated signals to determine a location of a mobile device relative to the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described herein provide for locating a mobile device relative to a vehicle using mechanical waves and modulation techniques. In one example, a high frequency carrier wave that is generally inaudible to humans is modulated with a low frequency baseband signal that provides for accurate localization in order to generate a modulated signal. The modulated signal is a mechanical or pressure wave, as opposed to an electromagnetic (EM) wave, that is produced or transmitted by one or more speaker(s) and is received by one or more microphone(s). By transmitting a modulated signal from a speaker on the mobile device to a number of microphones that are mounted on the vehicle and are specifically spaced apart, for example, the method and system are able to establish multiple localization paths that can then be used to determine the location of the mobile device, relative to the vehicle. The term "localization path," as used herein, means the path travelled by a mechanical wave from a speaker to a microphone.

In some embodiments, the speaker(s) are part of the mobile device while the microphone(s) are mounted on the vehicle, while in other embodiments, this is reversed so that the speaker(s) are mounted on the vehicle and the microphone(s) are part of the mobile device. In some embodiments, there is a single speaker and multiple microphones, whereas other embodiments have multiple speakers and a single microphone or even multiple speakers and multiple microphones. So long as multiple localization paths are established, the method and system can use any suitable combination of speaker(s) and microphone(s) to transmit, receive and process mechanical waves traveling along distinct localization paths in order to determine the relative location of the mobile device, with respect to the vehicle. Although the following description is provided in the context of an example where a single speaker is located on the mobile device and multiple microphones are located on the vehicle, it should be appreciated that the present application is not limited to such an example, as any of the aforementioned examples or other examples may be used instead.

The audible frequency range for most humans extends between about 20 Hz and 19 kHz, although this can fluctuate based on factors such as the age of the person, etc. The present method and system use a high frequency carrier wave, such as one with a frequency that is equal to or greater than 15 kHz, so that the resulting modulated signal is generally inaudible or otherwise undetectable to most humans in the nearby vicinity. In order to achieve desirable localization accuracy, however, the microphones located on the vehicle must have a spacing that is less than one-half of the wavelength (½ λ) of the signals involved. By modulating the high frequency carrier wave with a low frequency baseband signal, for example one that has a frequency less than or equal to 500 Hz, the one-half wavelength spacing requirement becomes much easier to satisfy. To illustrate, assume that the speed of sound in air is typically about 340 m/s (these waves are mechanical waves). Since the wavelength of a high frequency carrier wave having a frequency of 19 kHz, for example, is about 0.018 m, the microphones on the vehicle would have to be spaced at a distance that is less than about 0.009 m (0.9 cm) apart in order to satisfy the one-half wavelength spacing requirement; such tight design constraints would be extremely difficult to economically achieve for most vehicle mounted microphones. Using the same assumptions, the wavelength of a low frequency baseband signal having a frequency of 500 Hz is about 0.68 m, which results in a much more manageable 0.34 m (34 cm) threshold to satisfy the one-half wavelength spacing requirement. In this manner, the present method and system combines the inaudible benefits of the high frequency carrier wave with the improved localization accuracy of the low frequency baseband signal to generate a modulated signal for determining the location of the mobile device relative to the vehicle.

Figure 1:
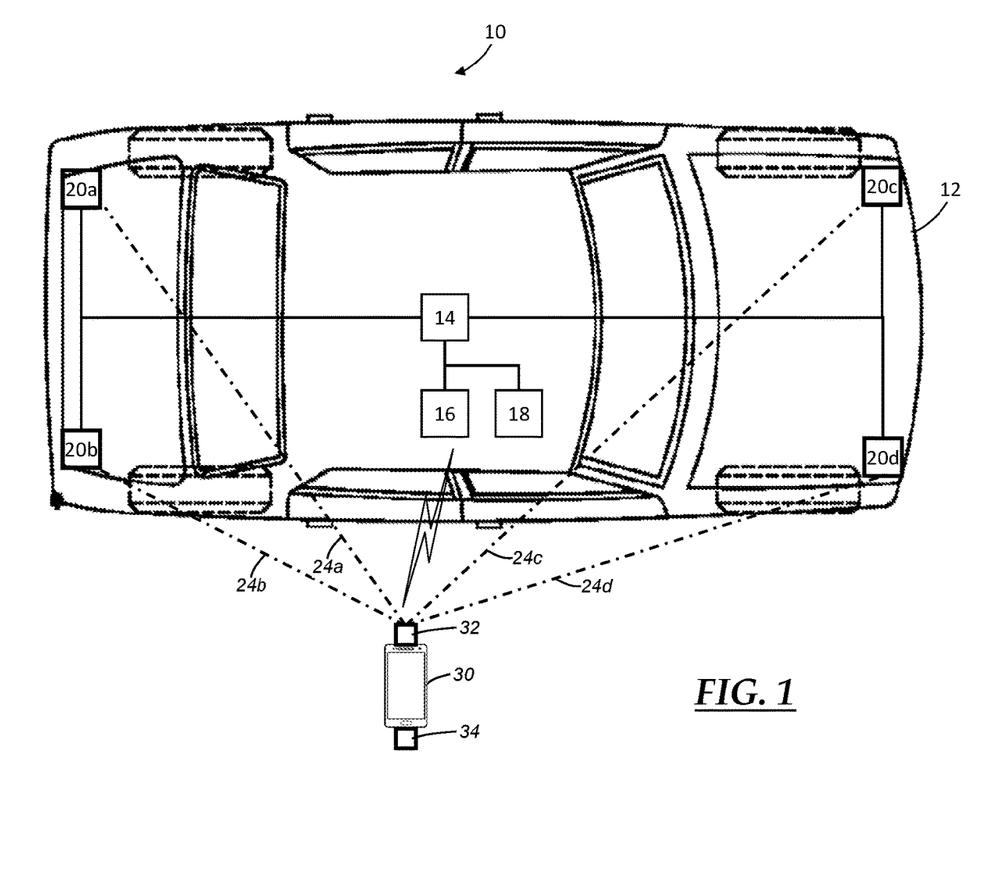
FIG. 1 is a schematic block diagram of an embodiment of a vehicle-mobile device localization system.
Figure 2:
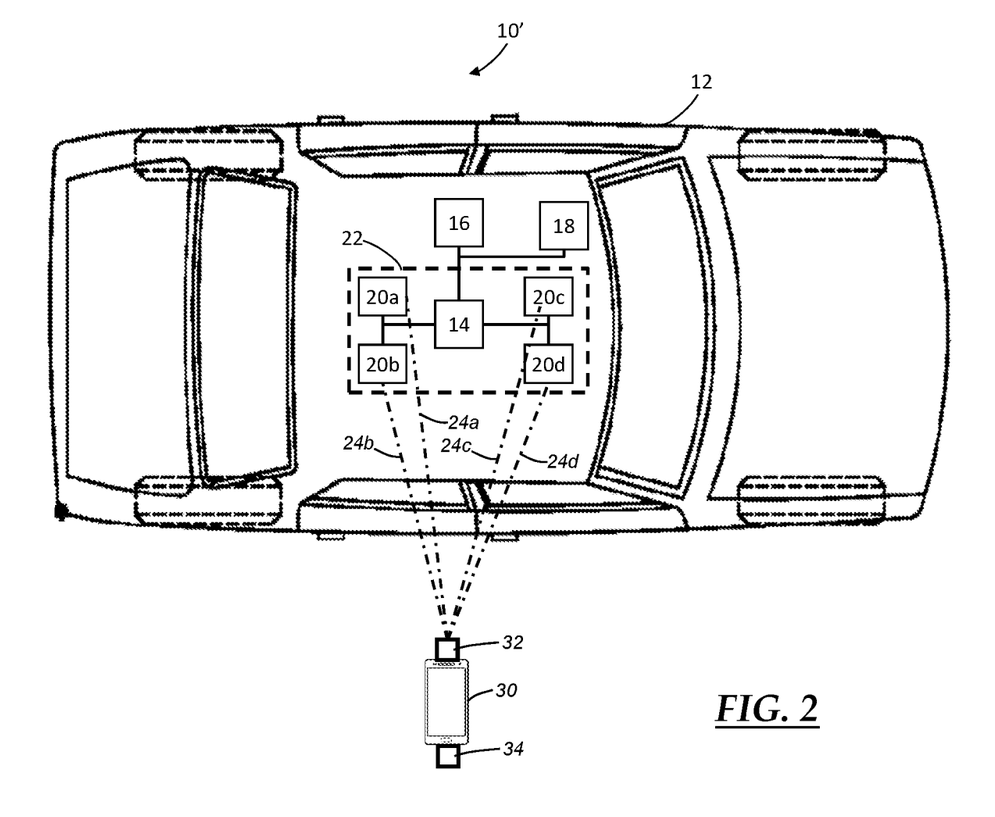
FIG. 2 is a schematic block diagram of another embodiment of vehicle-mobile device localization system.

FIGS. 1 and 2 illustrate two possible embodiments for a vehicle-mobile device localization system 10, 10' that can be used to implement the disclosed method. While the approach and methodology described herein are discussed with respect to systems 10, 10', one of ordinary skill in the art will appreciate that such systems are merely two examples, and in many ways, the schematic block diagrams of these drawings have been simplified for ease of explanation. Other configurations and embodiments may certainly be used instead, as the vehicle-mobile device localization systems and method described herein represent just some of the possibilities. The vehicle-mobile device localization system 10 of FIG. 1 and the vehicle-mobile device localization system 10' of FIG. 2 are similar, with an exception being that system 10 includes mechanical wave input/output (I/O) devices that are installed at peripheral portions of the vehicle 12, whereas system 10' includes mechanical wave I/O devices that are installed within a single mechanical wave I/O array module 22 that is located at a central location of the vehicle 12.

The vehicle-mobile device localization system 10, 10' may utilize different combinations of devices, hardware, software, etc. on both a vehicle 12 and a mobile device 30 to carry out the method described herein. According to one example, system 10 includes an electronic control unit (ECU) 14, a wireless communications module (WCM) 16, a vehicle system module (VSM) 18, mechanical wave input/output (I/O) devices 20a-20d mounted on the vehicle, a mechanical wave I/O device 32 that is part of the mobile device, and a wireless communication module (WCM) 34 that is part of the mobile device. The VSM 18 is discussed herein as a door lock actuator that is operable between a locked and an unlocked state; however, the VSM 18 can include a variety of other VSMs that can interact with system 10 and is not limited to door lock actuators.

ECU 14 may be coupled to and interact with any number of devices or components located throughout the vehicle, including the different mechanical wave I/O devices 20a-20d. As discussed in more detail below, each of the mechanical wave I/O devices 20a-20d includes a microphone, a speaker, or both. The ECU 14 may be communicatively coupled to the mechanical wave I/O devices 20a-20d through any suitable hard-wired or wireless connection (e.g., a vehicle bus, a short-range wireless communications (SRWC) network, etc.). According to an embodiment where the mechanical wave I/O devices 20a-20d are microphones, when a modulated signal from the mobile device is picked up and received by the microphones, corresponding input data representative of the modulated signal can be sent from the various microphones to the ECU 14. In another embodiment where the mechanical wave I/O devices 20a-20d are speakers, the ECU 14 can send output data that includes instructions for directing the speakers to transmit or otherwise generate corresponding mechanical waves. In this way, the ECU 14 can be used to receive and process input data from microphones 20a-20d, it can be used to send output data in the form of modulated signal instructions to speakers 20a-20d, or it can be used for both, depending on the arrangement. As used herein, the term "transmit" and it's other verb forms, when used in reference to a mechanical wave or a mechanical wave I/O device, refers to propagating a mechanical wave through a medium, such as the atmosphere surrounding the vehicle.

The ECU 14 may include any suitable combination of hardware and/or software components, including a processor and memory. The processor can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. It can be a dedicated processor used only for ECU 14 or can be shared with other vehicle systems, devices, components, etc. The processor can execute various types of electronic instructions, such as software and/or firmware programs stored in the memory of the ECU 14, which enable the ECU to carry out various functionality. The memory of the ECU 14 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processor of the ECU 14 executes programs or processes data and the memory of the ECU stores programs or other data in order to help carry out or support at least a part of the present method.

WCM 16 is a wireless communications module that enables the vehicle to communicate with a variety of other devices, including mobile device 30, and is coupled to ECM 14, VSM 18 and/or any number of other devices located in the vehicle. Unlike the mechanical wave I/O devices 20a-20d, WCM 16 primarily transmits and receives wireless signals as electromagnetic waves, as opposed to mechanical waves, and can do so in the form of short-range wireless communications (e.g., Bluetooth™, Wi-Fi™, etc.) and/or long-range wireless communications (e.g., cellular carrier, telematics communications, etc.). In one embodiment, WCM 16 includes a short range wireless communications (SRWC) circuit, such as those adapted for Bluetooth™, other IEEE 802.15 communications, Wi-Fi™, other IEEE 802.11 communications, or other similar SRWC communication protocols. In another embodiment, WCM 16 includes a telematics unit that is capable of carrying out communications with a cellular, vehicle-to-vehicle, or other mobile network. The vehicle 12 can include multiple WCMs 16 (although only one is shown), such as both a SRWC module and a telematics unit. Although the WCM 16 is shown and described as being separate from the ECU 14, in other embodiments, the WCM can be incorporated into a single module along with the ECU 14. For example, the ECU 14 can include a first WCM 16 (e.g., a SRWC module) and the vehicle 12 can include a separate WCM 16 (e.g., a telematics unit).

Mechanical wave I/O devices 20a-d are devices or components that can receive mechanical waves (e.g., microphones) and/or that can transmit mechanical waves (e.g., speakers). Although four devices 20a-d are illustrated in FIG. 1, the vehicle 12 can include any number of mechanical wave I/O devices and, in some embodiments, the vehicle includes more or less than four such devices. As already mentioned above, it is possible for the mobile device 30 to include a mechanical wave I/O device in the form of a speaker and the vehicle 12 to include mechanical wave I/O devices in the form of microphones, or vice-versa. Similarly, it is possible for the mobile device 30 to include a single mechanical wave I/O device while the vehicle 12 includes multiple mechanical wave I/O devices, or vice-versa. So long as multiple localization paths are established between the mobile device 30 and the vehicle 12, any number of mechanical wave I/O device combinations may be employed.

In the embodiment where one or more of the mechanical wave I/O devices 20a-d are microphones, mechanical waves are received through the atmosphere at the microphone and are converted into electronic signals that can then be sent to the ECU 14 as input data. The microphones can be any suitable type of microphone, including, for example, a dynamic microphone that uses a diaphragm to engage mechanical waves and move a magnet in order to generate electrical signals representative of the mechanical wave. Other microphones can be used as well, such as condenser microphones and piezoelectric microphones. The microphones can be omnidirectional, unidirectional, cardioid, bi-directional, shotgun, or otherwise configured. The microphone can include corresponding circuitry that is used to sample or digitize the mechanical wave before sending it to the ECU 14, or such sampling can be performed at the ECU. Thus, the input data sent from the microphones to the ECU 14 can be in the form of analog or digital signals.

In the embodiment where one or more of the mechanical wave I/O devices 20a-d are speakers, the ECU 14 sends electronic signals to the speakers in the form of output data that causes the speakers to convert the output data into mechanical waves and transmit them through the atmosphere. Any type of suitable speaker may be used, including various loudspeakers. For example, a dynamic speaker can be employed where a diaphragm moves according to an electrical signal so as to produce a corresponding mechanical wave, such as a modulated signal discussed below. The speakers can include any number or type of drivers, such as tweeters, mid-range drivers, and/or woofers. The speakers can generate mechanical or pressure waves according to information received from the ECU 14, such as modulation information or parameters, which will be discussed more below. The output data sent from the ECU 14 to the speakers can be in the form of analog or digital signals.

The collection of mechanical wave I/O devices 20a-20d is referred to as the mechanical wave I/O device array (can be a microphone array or a speaker array) and the arrangement, alignment, spacing and/or orientation of such arrays may differ. In the example of FIG. 1, the mechanical wave I/O devices 20a-d are part of an array that is dispersed around the peripheral portions of the vehicle 12 (e.g., within the front and rear bumpers near the corners of the vehicle). In the example of FIG. 2, on the other hand, the mechanical wave I/O devices 20a-d are more consolidated in an array that is packaged within a single module or assembly and is located towards a center of the vehicle 12. These are, of course, only two possibilities. The configuration of the mechanical wave I/O device array, including the distances and angles between the individual devices 20a-d, may be used by the vehicle-mobile device localization method when determining the location of the mobile device relative to the vehicle. For instance, by knowing the configuration and spacing of the devices in the mechanical wave I/O device array, the method can use the relative phases of the different mechanical waves traveling along different localization paths to determine the location of the mobile device relative to the vehicle. The arrangement, alignment, spacing and/or orientation of the mechanical wave I/O device array can be represented by configuration data that is stored in the memory of the ECU 14 (or other VSM of the vehicle 12). In particular, the maximum distance between any two of the individual mechanical wave I/O devices 20a-d (referred to as the maximum I/O device distance) can be used to select an appropriate baseband frequency and should be less than one half of the wavelength of the baseband frequency; thus, the maximum I/O device distance and the one half wavelength spacing requirement are related. The maximum I/O device distance can be part of the configuration data and can be stored in the memory of the ECU 14, in memory of the mobile device 30, or both.

The mobile device 30 is an electronic device, such as a smart phone or a key fob, that includes a mechanical wave I/O device 32 and a wireless communication module 34. As already explained, the mechanical wave I/O device 32 can include a speaker, a microphone, or both, so long as at least two separate localization paths are established with the vehicle. For example, in the illustrated embodiments of FIGS. 1 and 2, the mobile device 30 includes a single speaker 32 and the vehicle 12 includes four microphones 20a-d. The single speaker 32 can transmit a modulated signal in the form of mechanical waves that are received at each of the microphones 20a-d via four separate localization paths 24a-d, with each localization path 24a-d being between the speaker 32 and one of the microphones 20a-d. The discussion above regarding the one-half wavelength spacing requirement and/or the maximum I/O device distance would apply to the mobile device 30 as well, assuming that device includes multiple mechanical wave I/O devices 32.

Figure 3A:
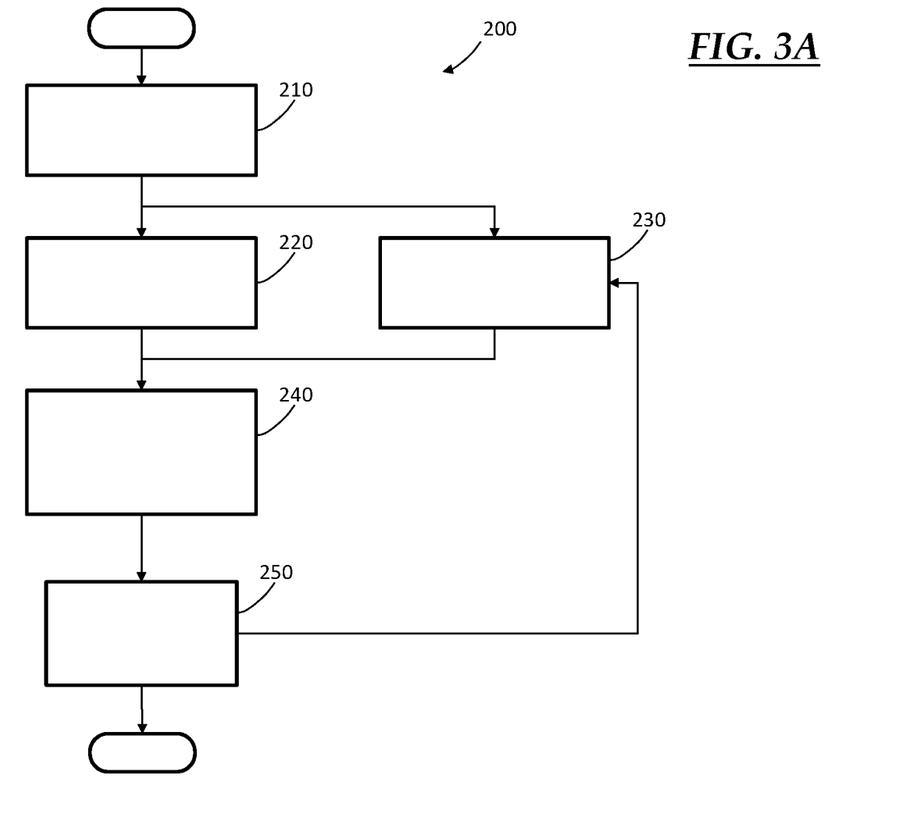
FIG. 3A is a flowchart depicting an embodiment of a portion of a method for locating a mobile device relative to a vehicle, particularly the steps of generating and transmitting a modulated signal.
Figure 3B:
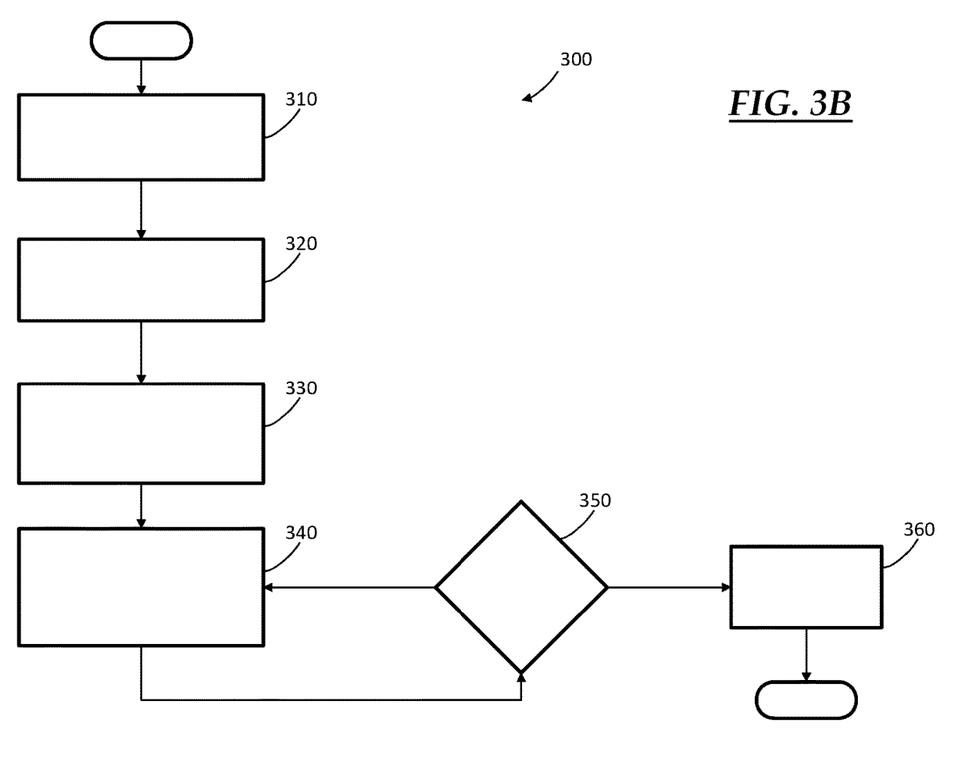
FIG. 3B is a flowchart depicting an embodiment of another portion of a method for locating a mobile device relative to a vehicle, particularly the steps of receiving and demodulating the modulated signal.

An embodiment of the present method is illustrated in FIGS. 3A and 3B, with FIG. 3A describing steps of a method 200 for generating and transmitting modulated signals and FIG. 3B describing steps of a method 300 for receiving and processing such signals in order to locate a mobile device relative to a vehicle. The combinations of steps 200, 300 are preferably used together in the present method.

Beginning with step 210, the method receives an indication or otherwise detects some condition or event signaling it to begin transmitting a modulated signal (i.e., to start the method). In one example, step 210 detects that a user with a mobile device 30 is nearby, perhaps by determining that the vehicle 12 and the mobile device 30 have recently been wirelessly paired, such as via a SRWC protocol (e.g., Bluetooth™). In an example where the mobile device 30 is used as a key to access or control the vehicle 12, the WCM 34 can establish a SRWC connection with WCM 16 and can exchange authentication information therebetween (e.g., a virtual vehicle key). Once authenticated, the vehicle 12 can inform the mobile device 30 that it has been authenticated, which can act as the indication to start transmitting a modulated signal—in other words, as an indication that the vehicle-mobile device localization process can begin. It is possible for different indications, other than vehicle-mobile device pairing, to be used to initiate the vehicle-mobile device localization. The method 200 continues to steps 220 and 230.

Steps 220 and 230 are described herein as being carried out simultaneously or nearly simultaneously. However, in other embodiments, these steps can be carried out serially, such as first carrying out step 220 and then step 230 or carrying out step 230 and then step 220. In step 220, carrier wave information is obtained and is designed so that the modulated signal is inaudible to most humans. In one embodiment, the carrier wave information includes a carrier wave frequency, a carrier wave amplitude, a carrier wave power and/or other parameters of the carrier wave to be used. When the frequency of the carrier wave, which is a mechanical or sound wave, is equal to or greater than approximately 19 kHz, the wave is generally inaudible to humans. And, in at least some embodiments, the average carrier frequency is at least thirty-eight times greater than the average baseband frequency. In one embodiment, the carrier wave information is stored in and obtained from memory located on the mobile device 30, but in other embodiments, the carrier wave information changes and is provided through the WCM 34 from the vehicle 12, a remote facility and/or some other source as part of an enhanced security feature, as described below.

In step 230, baseband signal information is obtained and is designed so that the modulated signal will enable accurate localization. In one embodiment, the baseband signal information includes a baseband signal frequency, a baseband signal amplitude, a baseband signal, baseband modulation schemes, baseband center frequencies and/or other parameters of the baseband signal to be used. When the frequency of the baseband signal is less than or equal to 500 Hz (e.g., between 100 Hz and 500 Hz) and the corresponding half wavelength spacing requirement is satisfied, the method is usually able to accurately determine the location of the mobile device 30 relative to the vehicle 12. As explained below, the carrier wave and/or the baseband signal may have a single frequency (single tone) or multiple frequencies (e.g., multiple tone, narrowband, wideband, etc.). The phrases "average carrier frequency" and "average baseband frequency," as used herein, respectively mean the average frequencies of the carrier wave and the baseband signal over the course of a particular signal transmission. Therefore, the condition that a baseband signal have an average baseband frequency that is less than an average carrier frequency means that, over the course of a particular signal transmission, the average frequency of the baseband signal must be less than the average frequency of the carrier wave. It is possible for the baseband signal to momentarily have a baseband frequency that is greater than a corresponding carrier frequency and still satisfy the previous condition, so long as the average frequency of the baseband signal is less than the average frequency of the carrier wave over the particular signal transmission. As with the carrier wave information, the baseband signal information may be stored locally in memory in the mobile device 30, it may be obtained wirelessly via WCM 34 from the vehicle 12, a remote facility and/or some other source.

The baseband signal frequency may be selected based on the maximum I/O device distance. For example, the baseband signal frequency $f_B$ can be selected to satisfy the following equations:

$$f_B = v/\lambda_B, \text{ where } \lambda_B \geq 2 * d_{max}$$

where v is the speed of sound (or mechanical waves) in the atmosphere (or other medium), $\lambda_B$ is the baseband signal length and $d_{max}$ is the maximum I/O device distance. As mentioned above, in one embodiment where a single speaker and a plurality of microphones are used, the distance $d_{max}$ can be the maximum distance between any two of the microphones (e.g., microphones 20a and 20d in FIGS. 1 and 2). In another embodiment where a single microphone and a plurality of speakers are used, the distance $d_{max}$ can be the maximum distance between any two of the speakers. And, in embodiments where a plurality of microphones are used and a plurality of speakers are used, the distance $d_{max}$ can be the greater of the maximum distance between any two of the microphones and the maximum distance between any two of the speakers. At least in some embodiments, as will be appreciated by those skilled in the art, using this relationship between the maximum I/O device distance $d_{max}$ and the baseband signal length enables an accurate direction of arrival (DOA) to be derived.

The present method may utilize different modulation schemes when generating the modulated signal. For instance, it is possible for the carrier wave to be modulated with a baseband signal $B_S$ having only a single baseband frequency (i.e., a single frequency or a single tone baseband signal). In other instances, such as when additional security measures are needed or when there is a significant amount of background noise, the carrier wave may be modulated with baseband signals having varying or changing baseband frequencies (i.e., multiple frequency or multiple tone baseband signal). In a modulation scheme using multiple frequency or tone baseband signals, the carrier wave is modulated with a rotating set of baseband signals that change according to a modulation scheme known to both the mobile device 30 and the vehicle 12. For example, the carrier wave can be modulated with a first baseband signal (e.g., a single tone baseband signal $B_{S-single}$) for a period of time, then the carrier wave can be modulated with a second baseband signal (e.g., a narrow band baseband signal $B_{S-narrow}$) for a period of time, and then the carrier wave can be modulated with a third baseband signal (e.g., a wide band baseband signal $B_{S-wide}$) for a period of time, before cycling back to the first baseband signal and repeating the cycle. In such embodiments, a remote facility and/or some other source may provide both the mobile device 30 and the vehicle 12 with carrier wave information and/or baseband signal information ahead of time so that a mutually known and agreed upon modulation scheme can be established. For the single tone baseband signal $B_{S-single}$, a single baseband frequency $f_B$ can be included in the baseband signal information. For multi-tone baseband signals, such as the narrow band baseband signal $B_{S-narrow}$ and the wide band baseband signal $B_{S-wide}$, parameters such as bandwidths, center frequencies, passwords, etc. may be included with the carrier wave and/or baseband signal information and can be sent to WCMs 16 and/or 34. After the carrier wave information (step 220) and the baseband signal information (step 230) are obtained, the method 200 continues to step 240.

In step 240, a modulated signal is generated based on a baseband signal and a carrier wave. In one embodiment, the baseband signal is modulated over the carrier wave using amplitude modulation; however, in other embodiments, other types of modulation can be used instead. The carrier wave can be defined by the following carrier wave equation:

$$C(t)=\cos(2\pi f_c t)$$

where C(t) is the carrier wave equation, $f_c$ is the carrier frequency, and t is time. In at least some embodiments, the carrier frequency $f_c$ is specified by the carrier wave information as discussed above. In one embodiment, such as in the case where a single tone baseband signal is used, the following baseband equation can be used:

$$B(t)=\cos(2\pi f_B t)$$

where B(t) is the baseband signal equation, $f_B$ is the baseband (or modulation) frequency, and t is the time. Of course, other baseband equations can be used, such as when multi-tone (e.g., narrowband, wideband) baseband signals are used for modulation. In one embodiment, when multiple baseband signals (or signal types) are used, the baseband signals can be modulated over a common carrier wave and/or using a common carrier frequency.

In continuing with the previous example of the carrier wave equation C(t) and the baseband equation B(t), a modulated signal equation that represents a modulated signal $M_S$ generated by applying the baseband signal (or wave equation) to the carrier wave can be obtained:

$$X(t)=A(1+M_a \cos(2\pi f_m t))\cos(2\pi f_c t)$$

where X(t) is the modulated signal equation, A is the amplitude of the carrier wave, and $M_a$ is amplitude of the baseband signal. The modulation parameters A and $M_a$ can be obtained during steps 220 and/or 230, for instance. Keeping with the example where a speaker 32 on the mobile device 30 is used to transmit a modulated signal to the vehicle 12, electrical signals in the form of output data that are representative of the desired modulated signal can be provided by the mobile device to the speaker for transmission.

Although amplitude modulation using a single tone baseband signal is described above, various other modulation techniques using various different baseband signals can be used. For example, amplitude modulation using multiple frequency baseband signals, frequency modulation using a single frequency baseband signal, or frequency modulation using multiple frequency baseband signals could be used instead, to name just a few of the possibilities. In other embodiments, phase modulation or other modulation techniques can be used. The method then continues to step 250.

In step 250, the modulated signal is transmitted through the surrounding atmosphere by one or more speakers. According to the previous example, output data in the form of electronic signals are sent to the speaker 32 of the mobile device 30 and then the speaker produces a mechanical or sound wave according to the modulation signal $M_S$. The mechanical wave can be transmitted by the speaker 32 and received at the microphones 20a-d of the vehicle 12 over the four localization paths 24a-d. The modulated signal can be transmitted for a particular amount of time and/or at a particular interval. For example, the modulated signal can be transmitted by the speaker 32 for a first interval before waiting a second interval, after which the modulated signal can be transmitted again for the first interval. Various other techniques and schemes can be used instead.

In embodiments that use multiple frequency baseband signals (e.g., the rotating example above), steps 230-250 can be carried out sequentially for each of the different baseband signals. For example, three sequentially generated modulated signals can be generated and transmitted, such as a first modulated signal based on a single tone baseband signal $B_{S-single}$ (referred to as a single tone modulated signal $M_{S-single}$), a second modulated signal based on a narrowband baseband signal $B_{S-narrow}$ (referred to as a narrowband modulated signal $M_{S-narrow}$), and a third modulated signal based on a wideband signal $B_{S-wide}$ (referred to as a wideband modulated signal $M_{S-wide}$). In such a case, the multiple modulated signals can be transmitted by the speaker in a serial fashion. For example, first, the single tone modulated signal $M_{S-single}$ can be transmitted for 0.1 seconds, then the narrowband modulated signal $M_{S-narrow}$ can be transmitted for 0.1 seconds, and then the wideband modulated signal $M_{S-wide}$ can be transmitted for 0.1 seconds. This process can then be repeated a certain number of times or until a feedback signal is received from the vehicle 12 (or other receiving device) (e.g., via WCM 16 and/or 34).

With reference to FIG. 3B, there is shown a portion 300 of the method that is directed to receiving a modulated signal and using it to locate a mobile device relative to a vehicle. The method 300 is preferably carried out after the method 200. In one embodiment, the method 300 is carried out at the vehicle 12 and, more particularly, by the ECU 14 and/or the mechanical wave I/O devices 20a-d (e.g., microphones located on the vehicle).

In step 310, the modulated signal is received at a plurality of microphones. As discussed above, the modulated signal can be transmitted via mechanical waves from the speaker 32 of the mobile device 30. The modulated signal $M_S$ is then received at the microphones 20a-d of the vehicle 12 over a plurality of localization paths 24a-d, as illustrated in FIGS. 1 and 2. Thus, for each localization path n, a modulated signal $M_{S,n}$ is received. For example, microphone 20a receives a modulated signal $M_{S,1}$ that corresponds to localization path 24a, microphone 20b receives a modulated signal $M_{S,2}$ that corresponds to localization path 24b, microphone 20c receives a modulated signal $M_{S,3}$ that corresponds to localization path 24c, and microphone 20d receives a modulated signal $M_{S,4}$ that corresponds to localization path 24d. The microphones 20a-d can transform the acoustical or mechanical energy of the modulation signals into corresponding input data in the form of electrical signals that can be sent to ECU 14 to help determine the location of the mobile device relative to the vehicle.

In step 320, the received modulated signals are demodulated. For example, the four modulated signals $M_{S,1}$ to $M_{S,4}$ are each demodulated to obtain demodulated signals $D_{S,1}$ to $D_{S,4}$. Various demodulation techniques can be used. The demodulated signals $D_{S,1}$ to $D_{S,4}$ represent the baseband signal $B_S$ as it is observed at each of the microphones 20a-d. In one embodiment, the demodulation can be carried out at each individual microphone 20a-d. In another embodiment, the received modulated signals $M_{S,1}$ to $M_{S,4}$ are sent to the ECU 14, which can then demodulate the signals. Certain characteristics of the demodulated signals, such as the phase or amplitude of the demodulated signal (or wave) can be identified. For example, a time value (e.g., timestamp) and/or the amplitude or phase of each the demodulated signals can be obtained from demodulating the received modulated signal along each localization path 24a-d.

In step 330, which is optional, the demodulated signals can then be stored in memory. In one embodiment, the demodulated signals $D_{S,1}$ to $D_{S,4}$ are stored in the memory of the ECU 14. In other embodiments, another memory device of the vehicle 12 can be used. The method 300 may then continue to step 340.

In step 340, the demodulated signals are processed to determine a location of the mobile device relative to the vehicle. In one embodiment, determining the location of the mobile device includes determining the direction of arrival (DOA) of the mobile device 30 (or speaker 32) relative to the vehicle 12 (or microphone array 22). Various processing techniques can be used to determine a DOA or other location characteristics pertaining to the signal. For example, the phase and/or amplitude of each of the demodulated signals is indicative of a length of that particular localization path (i.e., the phase of the signal when received at a microphone indicates the distance between the speaker and that particular microphone, within a one half wavelength; hence, the one half wavelength spacing requirements). By knowing the relative length of each of the localization paths, as well as the configuration of the mechanical wave I/O device array (i.e., the position of each of the microphones relative to one another), the location of the mobile device relative to the vehicle can be determined. In a particular embodiment, a MUSIC (Multiple Signal Classification) technique is applied to the demodulated signals $D_{S,1}$ to $D_{S,4}$ to help determine the DOA, as is understood by those skilled in the art. The method 300 then continues to step 350.

In step 350, it is determined whether to accept the determination made in step 340. In one embodiment, the method may apply an acceptance threshold to the MUSIC score, although other acceptance or confirmation techniques may be used instead. When it is determined to accept the determination made in step 340, the method continues to step 360; otherwise, the method loops back to step 340.

In the case that the results are not accepted, the location of the mobile device relative to the vehicle can be calculated using a next set of demodulated signals. In one embodiment, a next set of single tone demodulated signals $D_{S,1\text{-}single}$ to $D_{S,4\text{-}single}$ can be used. As mentioned above, in other embodiments, numerous different baseband signals and/or modulation schemes can be used for modulation of the carrier wave, including single tone baseband signals, narrowband baseband signals, and wideband baseband signals. Step 340 can be carried out for the single tone demodulated signals $D_{S,1\text{-}single}$ to $D_{S,4\text{-}single}$ and, when it is determined in step 350 that the results are unacceptable, step 340 can be carried out again using the narrowband demodulated signals $D_{S,1\text{-}narrow}$ to $D_{S,4\text{-}narrow}$. Then, in step 350, it can be determined whether the location determination results based on the narrowband demodulated signals $D_{S,1\text{-}narrow}$ to $D_{S,4\text{-}narrow}$ is acceptable and, if not, step 340 can be carried out using the wideband demodulated signals $D_{S,1\text{-}wide}$ to $D_{S,4\text{-}wide}$. This process, which is optional, can be repeated until results are accepted.

In step 360, a vehicle action or function is carried out. In one scenario where it is determined that the mobile device 30 (and hence the user) is approaching the vehicle 12 and is near a particular vehicle door, such as a right-rear passenger door, step 360 may unlock and/or open the right-rear passenger door. In another embodiment, the method may determine that the mobile device 30 (and hence the user) is near a trunk of the vehicle and, in response, step 360 may automatically unlock and/or open the trunk in an anticipatory fashion. For example, the ECU 14 can send commands or other electronic signals to VSM 18 instructing it to unlock and/or open one or more vehicle doors, trunks, etc. Such a feature can be particularly useful in a car sharing type of application where a user is looking for an unfamiliar vehicle in a parking lot or parking structure with a large number of other vehicles (possible of the same make and model), so that the method helps locate the user relative to the vehicle in question and takes some type of additional action to help identify the vehicle to the user. In another example, once the mobile device 30 (and hence the user) is located and deemed to be heading towards the vehicle or is rather close to the vehicle, the ECU 14 could send commands to a visual and/or audible device on the vehicle (e.g., lights, a horn, etc.) and instruct it to notify the user of their close proximity. In another embodiment, the ECU 14 can select a particular vehicle action to be carried out based on parameters, such as user proximity or location. Various other vehicle actions are possible as well, as the method is not limited to any particular one or ones.

In other embodiments, the portion 200 of the method can be carried out by the vehicle 12 and the portion 300 of the method can be carried out by the mobile device 30. For example, the mechanical wave I/O devices 20a-d of the vehicle 12 can be speakers and the mechanical I/O device 32 of the mobile device 30 can be a microphone. In such a case, the vehicle 12 can generate and transmit the modulated signal $M_S$ from each of the four speakers. The microphone of the mobile device 30 can then receive each of the signals over a distinct localization path 24a-d. The mobile device 30 then can demodulate the signals and carry out the other steps of the method 300. In another example, the mobile device 30 can include a plurality of microphones and the vehicle 12 can include a single speaker to create a plurality of localization paths. In other embodiments, a plurality of speakers and a plurality of microphones can be used to establish a plurality of communication paths.

Figure 4:
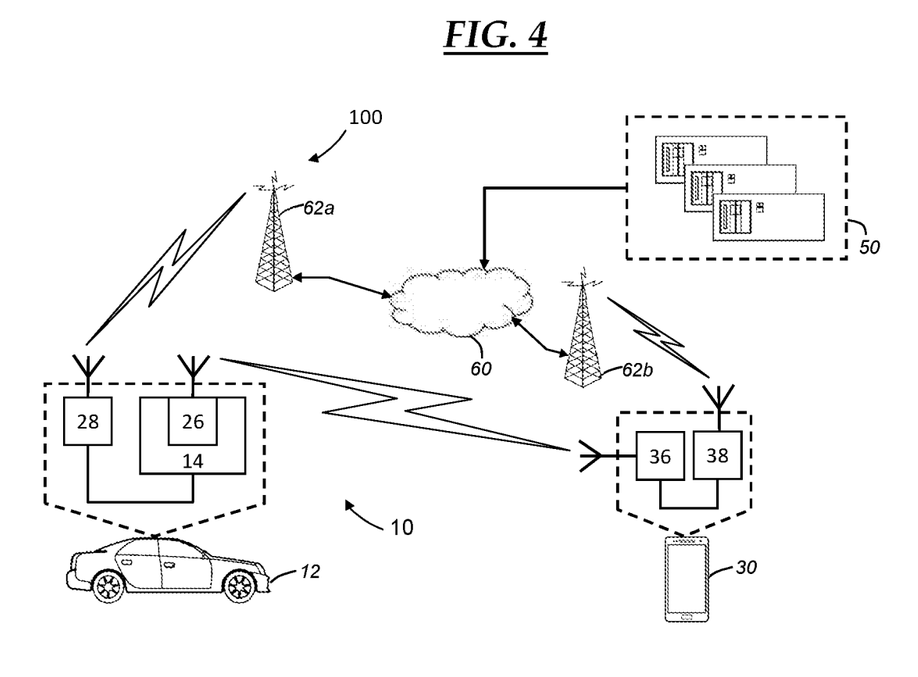
FIG. 4 is a schematic block diagram of a communications system that may be used to carry out one or more embodiments of the method described herein.

With reference to FIG. 4, there is shown a communications system 100 that can be used in conjunction with the vehicle-mobile device localization system and method previously described. The communications system 100 includes the vehicle-mobile device localization system 10, plus a remote facility 50 and a cellular carrier system 60. The cellular carrier system 60 can be any of a variety of cellular systems that are used for long-range radio communications, and is depicted as including two cellular towers 62a, b that can communicate with the vehicle 12 and/or the mobile device 30. The vehicle 12 may optionally include two WCMs 26, 28 and the mobile device may include two WCMs 36, 38, in addition to the mechanical wave I/O devices described above (i.e., the speaker(s) and microphone(s)).

WCMs 26, 36 are short-range wireless communications (SRWC) devices that utilize electromagnetic signals, as opposed to mechanical or sound waves, to carry out various SRWC, such as those discussed above. The SRWC device 26 of the vehicle 12 is shown as being included in the ECU 14; however, the SRWC device 26 may be located as a part of a separate VSM in other embodiments. WCMs 28, 38 are long-range radio communication devices and, in at least some embodiments, include a cellular chipset (or other suitable circuitry) for carrying out cellular communications with the cellular carrier system 60. WCM 28, for example, may be a vehicle telematics unit. In one embodiment, the mobile device 30 can download and install computer instructions (or an application) that causes at least some of the method steps to be carried out.

Figure 5:
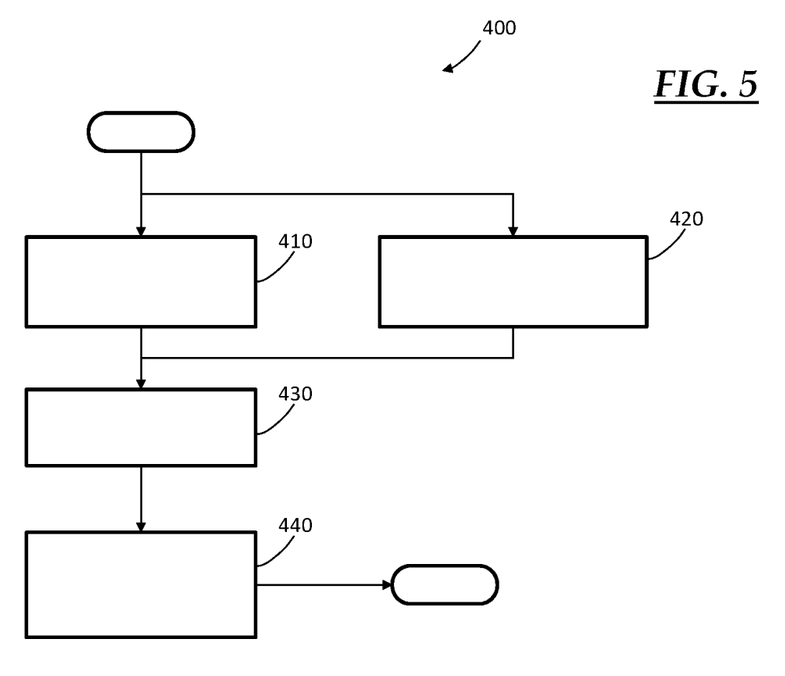
FIG. 5 is flowchart depicting an embodiment of an optional security process that may be used in conjunction with the method of FIGS. 2A and 2B.

With reference to FIG. 5, there is shown an embodiment of a method 400 of locating a mobile device relative to a vehicle. In one embodiment, the method 400 can be carried out in response to a car sharing reservation that is established by a vehicle user. The car sharing reservation can enable the vehicle user to be issued credentials (or authentication information) that enables the mobile device 30 of the vehicle user to access and/or control the vehicle 12. Other embodiments are certainly possible.

In step 410, authentication information and modulation information is transmitted from a remote facility to the vehicle. The authentication information can be a virtual vehicle key, user information, and/or other information that can be used to authenticate and/or authorize the vehicle user to access and/or control the vehicle 12. The modulation information can be carrier wave information and/or baseband signal information as discussed above (see steps 220 and 230 of the method 200 (FIG. 3A)). In one embodiment, the authentication information and the modulation information is provided by remote facility 50 to WCMs 28, 38 on the vehicle and mobile device, respectively. For example, the telematics unit 28 and the WCM 38 of the mobile device can establish connections with a server at the remote facility 50 using a cellular carrier system 60. The remote server (i.e., the server at the remote facility 50) can then provide the authentication information and the modulation information. Once received at the telematics unit 26, the authentication information and the modulation information can be sent to the ECU 14.

Steps 410 and 420 are described herein as being carried out at the same time. However, in other embodiments, these steps can be carried out serially, such as first carrying out step 410 and then 420 or carrying out step 420 and then step 410. In step 420, the authentication information and the modulation information is provided to the mobile device 30. In one embodiment, the authentication information and the modulation information is provided to the mobile device 30 via a connection with a remote server at the remote facility 50. For example, the authentication information and the modulation information is provided to the mobile device using the cellular carrier system 60. In another embodiment, the authentication information can be sent to the mobile device 30 from the remote facility 50 and, then, the vehicle 12 and the mobile device can establish a SRWC connection (step 430) when the mobile device 30 is authenticated by the vehicle 12 via the authentication information. Thereafter, using the secured SRWC connection, the modulation information can be communicated to the mobile device 30. The reverse is also true; the vehicle 12 can only receive the authentication while the mobile device 30 receives both the authentication information and the modulation information. Thereafter, the mobile device 30 can send the modulation information to the vehicle 12 via the secured SRWC connection.

In step 430, the mobile device is authenticated by the vehicle. The authentication information can be used to authenticate the mobile device 30 for access to and/or control of the vehicle 12. In one embodiment, the vehicle 12 can detect the presence of the mobile device 30 using the SRWC device 26 and, then, the mobile device 30 and the vehicle 12 can establish a secure SRWC connection. After establishing the secure SRWC connection, the mobile device 30 can send at least part of the authentication information to the vehicle 12, which can then determine whether to authenticate the mobile device 30 and/or whether the mobile device 30 is authorized to access and/or control the vehicle. When it is determined that the mobile device is not authenticated by the vehicle (e.g., the mobile device 30 is not authentic, the mobile device 30 is not authorized), the method 400 ends. Otherwise, the method 400 continues to step 440.

In step 440, a vehicle-mobile device localization process is carried out. In one embodiment, the methods 200 and/or 300 can be carried out by the vehicle-mobile device localization system 10. For example, in one embodiment, the mobile device 30 can transmit a modulated signal using one or more speakers 32 (FIGS. 1 and 2), which can then be received at one or more microphones 20*a-d* (FIGS. 1 and 2) of the vehicle 12. The modulated signal can include a carrier frequency of 15 kHz or more such that the signal is inaudible at least to some individuals. Once the mobile device 30 is located relative to the vehicle 12, a vehicle action can be performed, such as any of those mentioned above. The method 400 then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of locating a mobile device relative to a vehicle, the method comprising the steps:
generating a modulated signal from a carrier wave and a baseband signal where the modulated signal is a mechanical wave, the carrier wave has an average carrier frequency and the baseband signal has an average baseband frequency that is less than the average carrier frequency;
causing the modulated signal to be transmitted from at least two speakers located on the vehicle, the at least two speakers separated by less than one-half wavelength of the average baseband frequency;
causing the modulated signal transmitted from the speaker(s) to be received at one or more microphones located on the mobile device over a plurality of localization paths;
demodulating the modulated signal received at the microphone(s) for each of the plurality of localization paths to obtain a plurality of demodulated signals; and
processing the plurality of demodulated signals to determine a location of the mobile device relative to the vehicle based upon the baseband signal;
wherein audible characteristics of the modulated signal correspond to the carrier wave and localization characteristics of the modulated signal correspond to the base band signal.

2. The method of claim 1, wherein the average carrier frequency is greater than or equal to 15 kHz.

3. The method of claim 1, wherein the average baseband frequency is less than or equal to 500 Hz.

4. The method of claim 1, wherein the average carrier frequency is at least thirty-eight times greater than the average baseband frequency.

5. The method of claim 1, wherein each of the plurality of localization paths represents a specific path between one of the speaker(s) and one of the microphone(s), and wherein each localization path is different than the other localization paths.

6. The method of claim 1, wherein the processing step uses differences in the phase of the plurality of demodulated signals that are due to the different localization paths to determine the location of the mobile device relative to the vehicle.

7. The method of claim 6, wherein the processing step uses the MUSIC algorithm.

8. The method of claim 1, wherein the generating step includes generating a plurality of modulated signals, the plurality of modulated signals have a common carrier frequency and a plurality of different baseband frequencies.

9. The method of claim 8, wherein the method further includes rotating through a set of modulation schemes to generate the plurality of modulated signals.

10. The method of claim 9, wherein the method further includes determining whether to accept the location that was determined using the demodulated signals corresponding to a first baseband frequency type and, when it is determined to not accept the location that was determined using the demodulated signals corresponding to the first baseband frequency type, carrying out the determining step using other demodulated signals corresponding to a second baseband frequency type.

11. The method of claim 1, wherein the determining step further comprises determining a location of the mobile device relative to the vehicle by determining a direction of arrival (DOA) of the mobile device relative to the vehicle.

12. The method of claim 1, wherein at least one piece of carrier wave information or baseband signal information selected from the following list is wirelessly provided by a remote facility to mobile device and/or the vehicle: a carrier frequency, a carrier amplitude, a baseband frequency, a narrow baseband range, a wide baseband range, a baseband amplitude, or a modulation scheme.

13. The method of claim 12, wherein the at least one piece of carrier wave information or baseband signal information is wirelessly provided by a remote facility to mobile device and/or the vehicle in response to a car sharing or car rental reservation.

14. The method of claim 13, wherein the method further includes authenticating the mobile device at the vehicle by causing authentication information to be sent from the mobile device to the vehicle via short-range wireless communications (SRWC).

15. A vehicle-mobile device localization system, comprising:
at least two mechanical wave input/output (I/O) devices installed on a vehicle, the at least two mechanical wave I/O devices separated by less than one-half wavelength of an average baseband frequency;
an electronic control unit (ECU) installed on the vehicle and communicatively coupled to the at least two mechanical wave I/O devices, the ECU includes a processor and memory that stores computer instructions;
wherein the computer instructions, when executed by the processor of the ECU in conjunction with computer instructions stored on a mobile device, cause the vehicle-mobile device localization system to either:
transmit a modulated signal using the at least two mechanical wave I/O devices installed on the vehicle over a plurality of localization paths, where the transmitted modulated signal is generated from a carrier wave and a baseband signal and is a mechanical wave, the carrier wave has an average carrier frequency and the baseband signal has the average baseband frequency that is less than the average carrier frequency; or
receive a modulated signal at the at least two mechanical wave I/O devices installed on the vehicle over a plurality of localization paths, where the received modulated signal was generated from a carrier wave and a baseband signal and is a mechanical wave, the carrier wave has an average carrier frequency and the baseband signal has the average baseband frequency that is less than the average carrier frequency, and
wherein the vehicle-mobile device localization system demodulates the modulated signal for each of the plurality of localization path to obtain a plurality of demodulated signals, and then processes the plurality of demodulated signals to determine a location of a mobile device relative to the vehicle based upon the baseband signal;
wherein audible characteristics of the modulated signal correspond to the carrier wave and localization characteristics of the modulated signal correspond to the base band signal.

16. A method of locating a mobile device relative to a vehicle, the method comprising the steps:
generating a modulated signal from a carrier wave and a baseband signal where the modulated signal is a mechanical wave, the carrier wave has an average carrier frequency and the baseband signal has an average baseband frequency that is less than the average carrier frequency;

causing the modulated signal to be transmitted from at least one speaker located on the mobile device;

causing the modulated signal transmitted from the at least one speaker to be received at at least two microphones located on the vehicle over a plurality of localization paths, the at least two microphones separated by less than one-half wavelength of the average baseband frequency;

demodulating the modulated signal received at the microphone(s) for each of the plurality of localization paths to obtain a plurality of demodulated signals; and processing the plurality of demodulated signals to determine a location of the mobile device relative to the vehicle based upon the baseband signal;

wherein audible characteristics of the modulated signal correspond to the carrier wave and localization characteristics of the modulated signal correspond to the base band signal.

17. The method of claim 16, wherein the average carrier frequency is greater than or equal to 15 kHz.

18. The method of claim 16, wherein the average baseband frequency is less than or equal to 500 Hz.

19. The method of claim 16, wherein the average carrier frequency is at least thirty-eight times greater than the average baseband frequency.

20. The method of claim 1, wherein the generating step includes generating a plurality of modulated signals, the plurality of modulated signals have a common carrier frequency and a plurality of different baseband frequencies.

* * * * *